(12) United States Patent  
Baskin

(10) Patent No.: US 7,006,762 B2  
(45) Date of Patent: Feb. 28, 2006

(54) PULSE WIDTH MODULATOR

(76) Inventor: Brian L. Baskin, 1604 Villarita Dr., Campbell, CA (US) 95008

( * ) Notice: Subject to any disclaimer, the term of this patent is extended or adjusted under 35 U.S.C. 154(b) by 0 days.

(21) Appl. No.: 10/686,121

(22) Filed: Oct. 14, 2003

(65) Prior Publication Data

US 2005/0077848 A1    Apr. 14, 2005

(51) Int. Cl.
*H02P 7/29* (2006.01)
(52) U.S. Cl. .................. 388/829; 388/811; 388/831
(58) Field of Classification Search ................ 318/244, 318/245, 268, 432–434; 388/809–824, 828–841
See application file for complete search history.

(56) References Cited

U.S. PATENT DOCUMENTS

| | | | | |
|---|---|---|---|---|
| 3,577,057 A * | 5/1971 | Dyer | ...................... | 318/811 |
| 3,805,258 A * | 4/1974 | Longrigg | .................... | 431/13 |
| 4,119,901 A * | 10/1978 | Leenhouts | .................. | 318/685 |
| 4,211,961 A * | 7/1980 | Marumoto et al. | ......... | 318/139 |
| 4,244,015 A * | 1/1981 | Beebe | ............................ | 363/8 |
| 4,409,535 A * | 10/1983 | Hickman | .................... | 318/811 |
| 6,495,996 B1 * | 12/2002 | Redlich | ...................... | 323/300 |
| 6,504,334 B1 * | 1/2003 | Sogawa | ...................... | 318/599 |
| 6,614,208 B1 * | 9/2003 | Narita | .......................... | 323/283 |

OTHER PUBLICATIONS

B.P. Lathi, "Signal Processing and Linear Systems", Berkeley Cambridge Press, 1998. p. 277 defines a modulation signal; p. 257 defines a time shift property of a fourier transform signal.*

* cited by examiner

*Primary Examiner*—Bentsu Ro

(57) ABSTRACT

The present invention encompasses a high efficiency pulse width modulator comprising: a variable duty cycle oscillator for receiving an input signal and providing a low level switching signal; a source voltage differentiation dependant positive switching signal circuit for receiving the low level switching signal, a stable reference signal, a sample of a positive supply voltage signal, and an error signal and the providing a positive supply switching signal and a reference signal; a positive supply switching circuit for receiving the positive supply switching signal and providing an output signal to an inductive load; an output voltage dependant negative supply switching signal circuit for receiving the output signal and a negative supply voltage signal and providing a negative supply switching signal; a negative supply switching circuit for receiving the negative supply switching signal and providing clamping of the inductive load to the negative supply, an output sourced charge pump for receiving the output signal and the positive supply voltage signal and providing a high voltage power supply; an output comparison circuit for receiving a sample of the output signal and a reference signal from the positive supply switching circuit, comparing the output signal to the reference signal and turning off the positive supply switching circuit when the output signal is lower than the reference signal; and a timing circuit for receiving an error signal from the comparison circuit and providing a feedback signal to the error circuit.

7 Claims, 3 Drawing Sheets

PULSE WIDTH MODULATOR

BACKGROUND OF INVENTION

1) Field of Invention

This invention relates generally to voltage regulation devices and, more particularly to pulse width modulation.

2) Description of Related Art

Pulse width modulation has been employed for a number of years in order to attain high efficiency voltage regulation. There are, however, a plurality of drawbacks when utilizing pulse width modulation, in lieu of linear regulation in order to stabilize output voltage.

Pulse width modulators generate both input and output noise not present in linear regulation. A pulse width modulator's efficiency is primarily due to the fact that the output voltage is either at substantially the input voltage or substantially at ground potential. The fast switching between the two states, necessary in order to achieve high efficiency regulation, also generates input noise as input current is switched to and from the load. Low switching times also contribute to emitted noise at the system output.

Pulse width modulators also tend to be more complex than linear regulators, particularly when an inductive load is to be supplied. Whenever an input current to a load which has substantial inductance is eliminated, an opposing voltage is generated by the load. Two means have been employed in order to limit the magnitude of the opposing voltage. A snubbing diode, though simple to implement, limits the opposing voltage to approximately one volt below ground potential during the off state of current supplying switch. During this time a current, substantially equal to the current supplied while the current supplying switch conducts, passes through the diode. This current dissipates heat and limits the efficiency of the modulator. Synchronous modulation, whereby a second switch is accurately timed to shunt the opposing voltage to ground, is more efficient, but complex and accurate timing circuits are needed for implementation.

An input source with substantial inductance will also produce an opposing voltage of the same polarity as the supply source when the current to the load is eliminated. Input filtering is generally utilized in order to limit the opposing source voltage. The input filter adds substantial cost to the system and limits spatial efficiency. Non-adaptive open loop frequency limiting components have been utilized in order to increase the system switching times in order to reduce output noise emissions and to alleviate the requirements of the input filtering system. Because the filtering does not adapt to source and load elements, modulator efficiency is reduced over varying conditions.

In order to efficiently switch current to the load, an on board voltage multiplier is typically employed in order to energize the current passing switch. A typical multiplier consists of an oscillator, a rectifier circuit, and a filtering circuit, adding complexity to the modulator and limiting spatial efficiency.

SUMMERY OF INVENTION

In the present invention, the positive supply switching circuit, in conjunction with the load connected to the output of the circuit is used in lieu of a separate high current oscillator to energize a charge pump and thus provide a high voltage supply. When the charge of the pump is depleted, the output comparison circuit senses a drop in the output voltage and turns off the positive supply switching circuit, by way of the differentiation dependant positive switching signal circuit, allowing the load to recharge the pump.

The present invention employs an output dependant clamping circuit. Rather than switching the clamping circuit synchronous with the positive switching circuit, the clamping circuit is energized when the output voltage drops below the negative supply voltage. A multitude of benefits is derived from this approach. First, the clamping circuit does not have to be aligned in order to prevent interference with the positive switching circuit. Second, synchronization with paralleled circuits is unnecessary as the design prevents the clamping circuit from interfering with other circuits. Finally, although the present clamping circuit is nearly as simple as a clamping diode, it provides a clamping efficiency comparable to a synchronous circuit.

In order to reduce emitted and conducted noise on both the power supply input and the output of the circuit, a unique method is utilized whereby the supply voltage is sampled, compared to a stable voltage, differentiated with respect to time, and multiplied by the low level switching voltage to increase rise and fall timing of the output signal. Unlike other methods, the present invention provides rise and fall times that are adaptive to the output load in order to minimize input and output noise of the system.

DETAILED DESCRIPTION OF INVENTION

Figure 1:
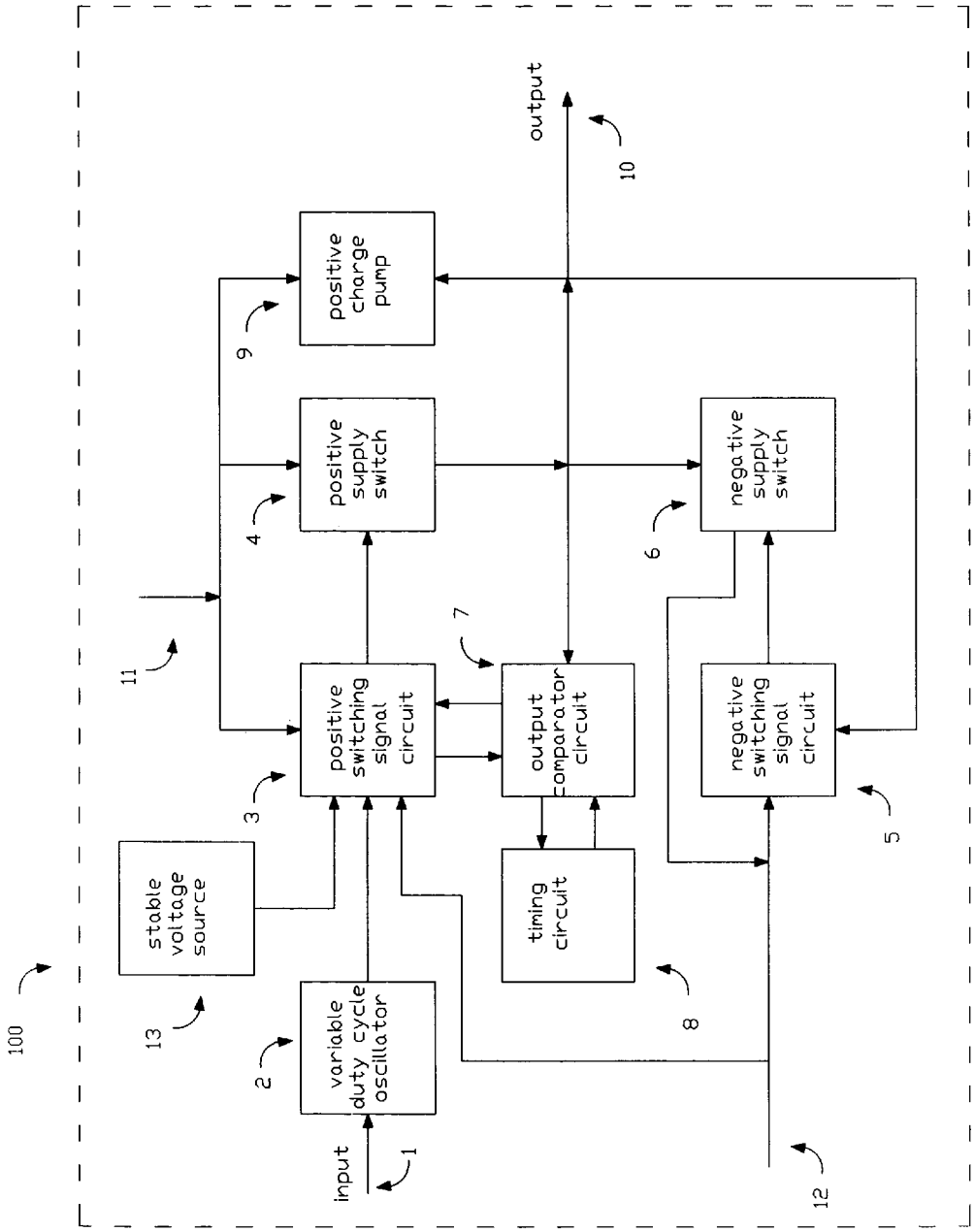
FIG. 1 shows a block diagram of the system.

FIG. 1 shows a block diagram of the present embodiment of the invention. In FIG. 1 the pulse width modulator system (100) comprises a signal input port (1) a variable duty cycle oscillator (2) a positive switching signal circuit (3) a positive supply switch (4) a negative switching signal circuit (5) a negative supply switch (6) an output comparator circuit (7) a timing circuit (8), a positive charge pump (9) an output port (10), a positive voltage source input port (11) a negative voltage source input port (12), and a stable voltage source (13).

The variable duty cycle oscillator (2) provides an alternating current output signal, whereby the alternating current output signal duty cycle is a function of a received input voltage or current at the input signal port (1).

The positive switching signal circuit (3) receives the alternating current output signal, a first sample signal from the positive voltage source input port (11), a first sample signal from the negative voltage source input port (12), a stable voltage signal from the stable voltage source (13), and provides a positive supply switching signal, whereby the positive supply switching signal is a function of the alternating current output signal, the first sample signal from the from the positive voltage source input port (11), and the stable voltage signal. In the preferred embodiment, the positive switching signal circuit (3) also receives an error signal from the output comparator circuit (7), and outputs a reference signal, whereby the positive supply switching signal and the reference signal are functions of the error signal, the alternating current output signal, the first sample signal from the positive voltage source input port (11), and the stable voltage signal.

The positive supply switch (4) receives the positive supply switching signal and supplies current from the positive voltage source input port (11) to the output port (10), whereby the current supplied is a function of the positive supply switching signal. In the preferred embodiment, a field effect transistor is used for the positive supply switch.

A clamping diode may be connected in a manner whereby the diode will conduct current from the output port to the negative voltage source input port when current induced in the load by way of inductive reactance whenever the positive supply switch turns off produces a voltage that is substantially lower than the voltage at of the negative voltage source input port.

In the preferred embodiment, the negative switching signal circuit (5) receives a first sample of the output signal from the output port (10) and a negative voltage source reference signal from the negative voltage source input port (12) and provides a negative supply switching signal, whereby the negative supply switching signal is a function of the first sample of the output signal and the negative voltage source reference signal.

The negative supply switch (6) receives the negative supply switching signal and clamps current from the output port (10) to the negative voltage source input port (12), whereby the current clamped is a function of the negative supply switching signal. In the preferred embodiment, a field effect transistor is used for the negative supply switch.

The output comparator circuit (7) receives a second sample of the output signal from the output port (10), the reference signal from the positive switching signal circuit (3), and a timing signal from the timing circuit (8) and outputs the error signal.

The timing circuit (8) receives the error signal and outputs the timing signal.

The charge pump (9) receives a third sample of the output signal from the output port (10) and a second sample signal from the positive voltage source input port (11) and provides a supply voltage which is substantially higher than that of the positive voltage source.

Figure 2:
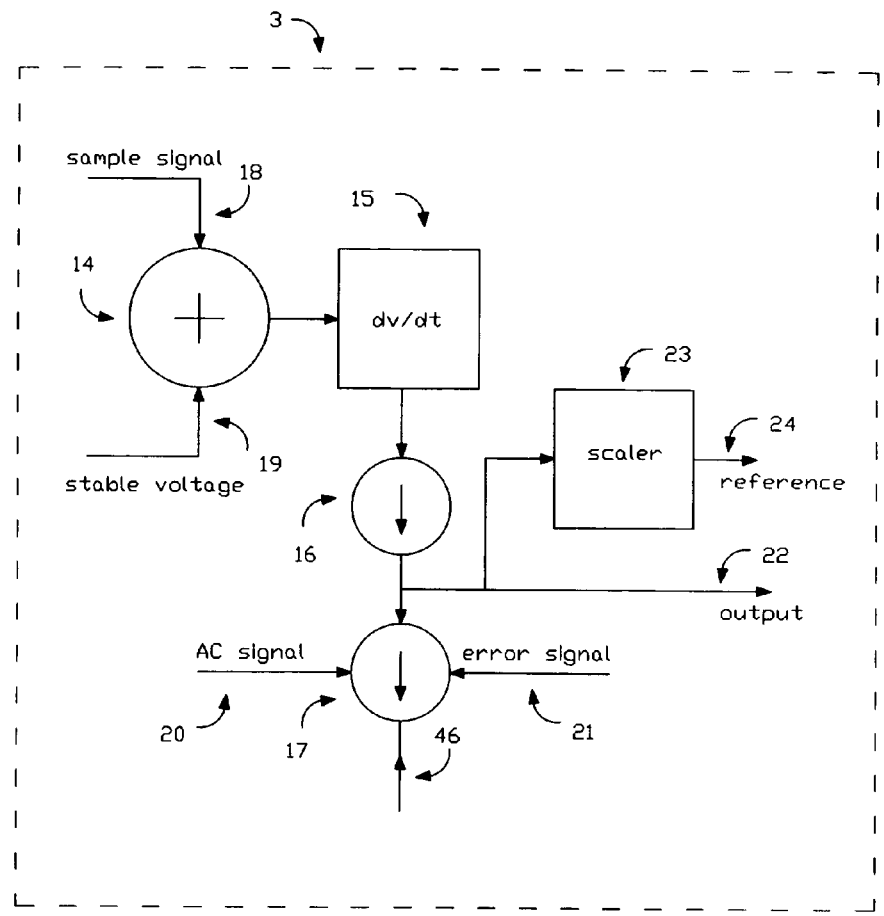
FIG. 2 shows a detailed diagram of the positive switching signal circuit.

FIG. 2 shows detail of the a positive switching signal circuit (3), which comprises a first summer (14), a first differentiator (15), a variable current source (16), a binary current source (17), a sample signal input port (18), a stable voltage input port (19), an AC signal input port (20) an error signal input port (21) a positive supply switching signal output port (22), a scaler circuit (23), a reference output port (24), and a negative supply input port (46).

The first summer receives a stable voltage signal from the stable voltage source (13) by way of the stable voltage input port (19) and the first sample signal from the positive voltage source input port (11) by way of the sample signal input port (18) and outputs a first difference signal to the differentiator (15), whereby the first difference signal is a function of the stable voltage and the first sample.

The differentiator (15) receives the first difference signal, differentiates the first difference signal with respect to time and outputs a differentiated first difference signal.

The variable current source (16) receives the differentiated first difference signal and outputs a positive current that is a function of the first differentiated difference signal.

The binary current source (17) receives the alternating current output signal from the variable duty cycle oscillator (2) by way of the AC signal input port (20), a first sample from the negative voltage source input port (12) by way of the negative supply input port (46), and the error signal from the output comparator circuit (7) by way of the error signal input port (21) and outputs a binary switching signal, whereby the binary switching signal is a function of the alternating current output signal and the error signal.

The switching signal output port (22) receives the positive current from the variable current source (16) and the binary switching signal and outputs a positive supply switching signal, whereby the positive supply switching signal is a function of the positive current from the variable current source (16) and the binary switching signal.

The scaler circuit (23) receives the positive supply switching signal from the switching signal output port (22) and adjusts the signal to provide a reference signal, whereby the reference signal approximates the proper output of the second sample of the output signal of the output port (10).

The reference port (24) outputs the reference signal.

The binary current source sinks a current which is substantially higher than the variable current source when set high, and substantially lower than the variable current source when set low. Either the error input signal or the AC input signal can set the binary current sink to the high mode. In other words, the high mode is a binary OR function of the error input signal and the AC input signal.

The variable current source provides a nominal current source to the output port which is varied by the change in voltage present at the sample signal input port. In other words, it the voltage at the positive voltage source input port (11) drops as the positive supply switch (4) receives the positive supply switching signal and supplies current from the positive voltage source input port (11) to the output port (10), the differentiator (15) will output a low voltage, lowering the current of the variable current source, and slowing the rise time at the switching signal output port (22). Conversely, if the voltage at positive voltage source input port (11) rises, the variable current source will raise in current output, allowing current to flow to the load by way of the positive supply switch (4) in order to keep the voltage at the positive voltage source input port (11) stable. In other words, the noise on the positive voltage source input port (11) is stabilized by controlling the change of current into the output load at port (10) by adjusting the rise and fall times at the switching signal output port (22).

Figure 3:
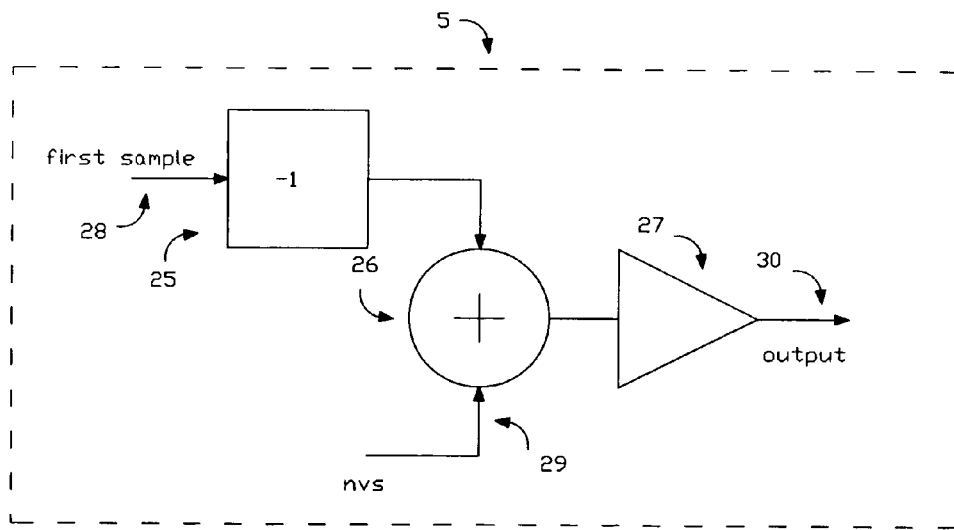
FIG. 3 shows a detailed diagram of the negative switching signal circuit.

FIG. 3 shows the negative switching signal circuit comprising an inverter (25), a second summer (26), an amplifier (27), a first sample input port (28), a first nvs input port (29) and a negative supply switching signal output port (30).

The inverter (25) receives a first sample of the output signal from the output port (10) by way of the first sample port (28) and inverts the signal to provide an inverted first sample of the output signal to the second summer (26) the second summer receives the inverted first sample of the output signal and the negative voltage reference signal from the negative voltage input port (12) by way of the first nvs port (29) and outputs a second difference signal. The amplifier (27) receives the second difference signal and outputs an amplified second difference signal to the negative supply switching signal output port (30).

In other words, as the output at the output port (10) drops below the negative voltage reference signal from the negative voltage input port (12), the negative switching signal circuit provides a signal at the negative supply switching signal output port (30) needed to energize the negative supply switch (6) in order to clamp current from the output load to the negative voltage input port (12).

Figure 4:
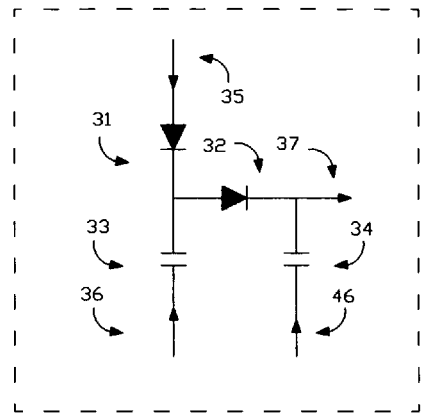
FIG. 4 shows a detailed diagram of the positive charge pump.

FIG. 4 shows the positive charge pump comprising a charging diode (31), a rectifying diode (32), a charge capacitor (33), a filter capacitor (34), a supply port (35) a charge port (36) a charge pump output port (37), and a second nvs port (45).

The supply port (35) receives power from the positive voltage source input port (11) and charges the charge capacitor (33) through the charging diode (31) when the input at the charge port (36), which is connected to the output port (10) is low. When the output port (10) changes to a high state, the input voltage at the charge port (36) is added to the charge of the charge capacitor (33) and transferred to the filter capacitor (34) through the rectifying diode (32). The filter capacitor (34) capacitively couples the charge pump output port to the negative voltage source input port (12) by way of the second nvs port.

Figure 5:
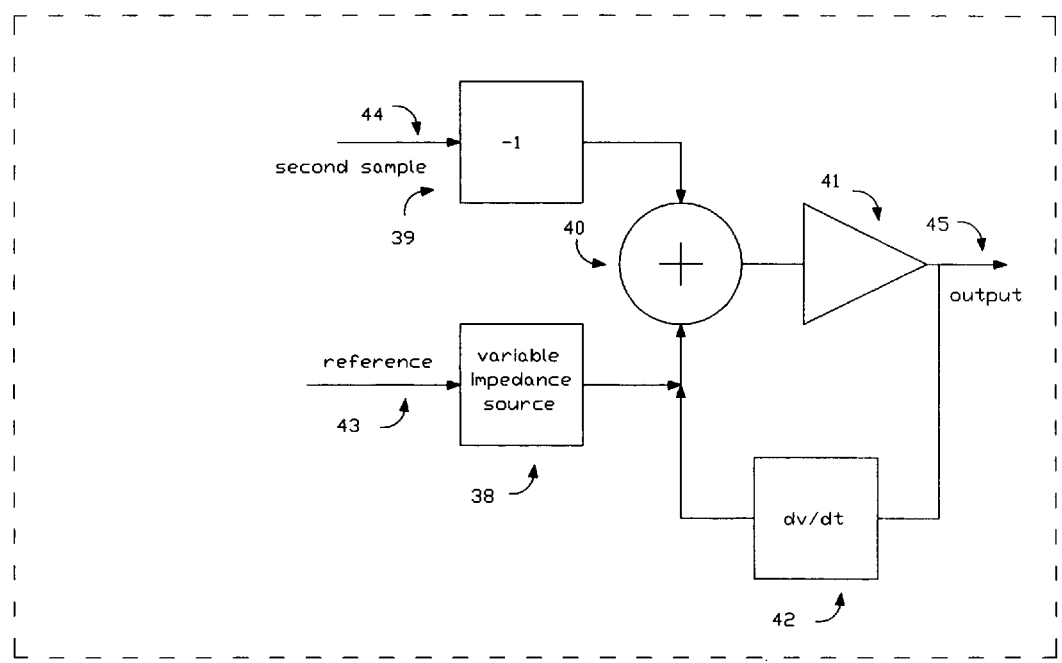
FIG. 5 shows a detailed diagram of the output comparator and timing circuit.

FIG. 5 shows a detailed diagram of the output comparator and timing circuit comprising a variable impedance source (38), an inverter (39), a third summer (40), a high gain amplifier (41), a second differentiator (42), a reference input port (43), a second sample port (44), and a comparator output port (45).

The variable impedance source provides a low source impedance and a high sink impedance and is selected from a group comprising a biased diode and a transistor in an emitter follower configuration.

The reference input port receives the reference signal from the positive switching signal circuit (3) The reference signal is transformed in impedance by way of the a variable impedance source (38) to output an impedance transformed reference signal. The second sample port (44) receives the second sample of the output signal from the output port (10) which is received and inverted by way of the inverter (39) to output an inverted second sample of the output signal. The summer (40) receives the impedance transformed reference signal, along with the inverted second sample of the output signal and outputs a summing signal, whereby the summing signal is comprised of receives the impedance transformed reference signal and the inverted second sample of the output signal signals to the high gain amplifier (41). The high gain amplifier (41) receives the summing signal and outputs an amplified summing signal to the comparator output port (45) and the second differentiator (41). The second differentiator (41) receives the amplified summing signal and outputs a differentiated amplified summing signal to the third summer (40).

If the second sample of the output signal is higher than the reference signal, the output remains low. If the second sample of the output signal is lower than the reference signal, the output transitions high. Because the sink impedance of the variable impedance source is high, the differentiator will raise the voltage of the impedance transformed reference signal when the amplifier output transitions high. The amplifier output will then remain high until the differentiator discharges.

What is claimed is:

1. A high efficiency motor control, said high efficiency motor control comprising:

a signal input port, said port receiving an input signal;

an output port, said output port for outputting a current to a load;

a variable duty cycle oscillator, said variable duty cycle oscillator providing an alternating current output, whereby said alternating current output is a function of the input signal;

a positive voltage source input port, said positive voltage source input port receiving a direct current positive voltage;

a negative voltage source input port, said negative voltage source input port receiving a direct current negative voltage that is substantially lower than said direct current positive voltage;

a positive switching signal circuit, said positive switching signal circuit receiving the alternating current output, a sample from the positive voltage source input port, a sample from the negative voltage source input port, and a stable input voltage, and outputting a positive supply switching signal, whereby the positive supply switching signal is a function of the alternating current output signal, the sample signal from the positive voltage source input port, and the stable voltage signal.

2. The high efficiency motor control of claim 1, wherein the high efficiency motor control also comprises a positive supply switch, said positive supply switch receiving the positive supply switching signal, and supplying current from the positive voltage source input port to the output port.

3. The high efficiency motor control of claim 1, wherein the high efficiency motor control also comprises a clamping diode, said clamping diode conducting current from the output port to the negative voltage source input port when the voltage at the output port is substantially lower than the voltage at the negative voltage source input port.

4. The high efficiency motor control of claim 1, wherein the high efficiency motor control also comprises a negative switching signal circuit, said negative switching signal circuit receiving a first sample of the output signal from the output port and a negative voltage source reference signal from the negative voltage source input port, and outputting a negative supply switching signal, whereby the negative supply switching signal is a function of the first sample of the output signal and the negative voltage source reference signal;

a negative supply switch, said negative supply switch receiving the negative supply switching signal and conducting current from the output load to the negative voltage source input port.

5. The high efficiency motor control of claim 1, whereby said positive switching signal circuit also receives an error signal and outputs a reference signal.

6. The high efficiency motor control of claim 5, wherein the high efficiency motor control also comprises an output comparator circuit, said comparator circuit receiving a second sample of the output signal, said reference signal and a timing signal and outputting said error signal, whereby said error signal is a function of the second sample of the output signal, said reference signal and said timing signal;

a timing circuit, said timing circuit outputting the timing signal, whereby said timing signal is a function of the error signal.

7. The high efficiency motor control of claim 1, wherein said high efficiency motor control also comprises a charge pump, said charge pump receiving a third sample of the output signal, a second sample signal from the positive voltage source input port and outputting a supply voltage which is substantially higher than that of the positive voltage source.

* * * * *